United States Patent [19]
Das et al.
[11] 4,166,882
[45] Sep. 4, 1979

[54] METHOD OF COATING WITH AQUEOUS THERMOSETTING ACRYLIC POLYMER LATEX OF UNIFORM PARTICLE SIZE

[75] Inventors: Suryya K. Das, Pittsburgh; Charles M. Kania, Tarentum, both of Pa.

[73] Assignee: PPG Industries, Inc., Pittsburgh, Pa.

[21] Appl. No.: 900,366

[22] Filed: Apr. 26, 1978

[51] Int. Cl.² .......................... B05D 7/14; B32B 15/08
[52] U.S. Cl. ................................ 428/463; 427/388 C; 427/388 A; 260/29.6 R; 260/29.6 PM; 260/29.6 T
[58] Field of Search ........... 427/45, 46, 388 C, 388 R, 427/388 A; 260/29.6 R, 29.6 PM; 428/463

[56] References Cited

U.S. PATENT DOCUMENTS

| | | | |
|---|---|---|---|
| 3,248,356 | 4/1966 | Snyder | 260/29.6 |
| 3,423,351 | 1/1969 | Pierce et al. | 260/29.6 |
| 3,981,837 | 9/1976 | Papalos et al. | 260/29.6 |
| 4,075,369 | 2/1978 | Ferraro et al. | 427/388 C |

*Primary Examiner*—Ralph S. Kendall
*Attorney, Agent, or Firm*—William J. Uhl

[57] ABSTRACT

An improved method of coating a solid substrate which is cured at a high temperature for a short period of time with a thermosetting aqueous acrylic polymer is disclosed. The improvement of the invention resides in: (i) the stability of the aqueous dispersion and (ii) the particle size of the dispersed particles which are large and uniform. The invention is particularly useful in coil coating applications where it eliminates the problem of solvent popping.

3 Claims, No Drawings

METHOD OF COATING WITH AQUEOUS THERMOSETTING ACRYLIC POLYMER LATEX OF UNIFORM PARTICLE SIZE

BACKGROUND OF THE INVENTION

1. Field of the Invention

The present invention relates to a method of coating and more particularly relates to a coating method in which the coating is cured at a high temperature for a short period of time such as coil coating.

2. Brief Description of the Prior Art

Coil coating involves the coating of a continuous length of flat metal sheet. The sheet which is usually thin gauge steel or aluminum is coiled over a spool which is continuously unwound and passed to a coating station where the sheet is coated usually by direct or reverse roll coating in a continuous manner as it passes through the station. After the coating is applied, the coated coil is passed to a baking station for curing.

Many commercially employed exterior coil coating compositions use organic solvent-based acrylic polymers as the resinous binder. However, these compositions present environmental problems with regard to solvent emissions. In attempts to overcome these problems, there have been suggestions in the prior art to use water-based acrylic polymers.

The water-based acrylic polymers which have been suggested are the thermosetting high molecular weight emulsion polymerized latex-type polymers which provide hard, durable coatings necessary to provide the long-term warranty requirements associated with coil coating uses such as home and industrial siding. Unfortunately, it has been found that many of the commercially available thermosetting water-based acrylic polymers do not provide commercially acceptable coatings for coil line use.

As mentioned above, after the metal coil has been coated, the substrate is passed to a baking station for curing. Since industrial coil coating lines operate at very high speeds, for example, about 300 feet a minute, the coil passes through the baking station very quickly, generally in less than 60 seconds. During this short residence time, the coating must be completely cured. Therefore, the baking stations are generally operated at very high temperatures, that is, about 450° F. (232° C.) and above so that the metal substrate will reach a peak metal temperature of at least 190° C. in less than 60 seconds. Under these rigorous curing conditions, many of the commercial thermosetting water-based acrylic coating compositions solvent pop, that is, develop bubbles just beneath the coating surface or actually develop holes in the coating.

Although not intending to be bound by any theory, it is believed that since many commercially available acrylic latices have a fairly wide distribution of particle sizes, the smaller particles become closely packed when the coating composition coalesces over the substrate. This close packing seals off the water (and any organic cosolvent) preventing them from evaporating. During the baking operation, the coating composition will crosslink before all the water and organic cosolvent has volatilized resulting in the remaining water and cosolvent accumulating as tiny bubbles beneath the exposed surface of the coating or bursting through the coating leaving a permanent hole.

It has been found that the particle size and distribution of the particle is a critical parameter in controlling solvent popping. Latices of uniform particle size of 2000–3000 Å with a deviation of ±300 Å eliminate solvent popping and are stable. Latices of uniform particle size larger than 3000 Å will not solvent pop but are unstable and form a hard, irreversible sediment on standing.

Latices of uniform particle size smaller than 2000 Å are stable but are extremely prone to solvent popping.

It is believed that the large uniformly sized latex particles do not pack together closely enough during coating, baking and coalescence to prevent the water and organic cosolvent from evaporating before the coating composition crosslinks.

SUMMARY OF THE INVENTION

In accordance with the present invention, an improved method of coating a solid substrate which is cured under conditions to reach a peak metal temperature of at least 190° C. within 60 seconds with a thermosetting aqueous acrylic latex polymer is provided. The improvement of the invention resides in coating the substrate with an acrylic latex polymer having a large uniform particle size such that the average particle size is within the range of 2000 to 3000 Angstrom units and the particle size deviation is ±300 Angstrom units.

The present invention also provides for a solid substrate coated by the improved method described above.

PERTINENT PRIOR ART

The prior art describes methods of making large or uniform particle size acrylic latices. For example, U.S. Pat. No. 3,981,837 discloses large particle size synthetic latices on the order of 1800–3500 Angstrom units by incorporating novel emulsifiers into the polymerization recipes. U.S. Pat. No. 3,423,351 discloses methods to make uniform particle size latices and U.S. Pat. No. 3,248,356 discloses multidisperse acrylic latices having controlled amounts of both large and small polymeric particles. However, the prior art does not disclose that acrylic latices with large uniform particle sizes would be useful in coil coating applications, nor does the prior art disclose any relationship of particle size to solvent popping.

DETAILED DESCRIPTION

The acrylic polymers which are used in the practice of the invention are copolymerized latex products obtained by emulsion polymerization in aqueous medium of vinyl and equivalently-reactive unsaturated monomers.

An example of vinyl monomers which can be used in preparing the high molecular weight acrylic polymers of the invention are esters of organic acids having terminal methylene groups which constitute from about 30 to 90, preferably 40 to 80 percent by weight of the total monomer charge. Examples of such esters include alkyl acrylates and alkyl methacrylates containing from 1 to 18 carbon atoms in the alkyl group.

Preferably, the acrylic polymer will contain a hard polymer segment derived from an alkyl methacrylate containing from 1 to 3 carbon atoms in the alkyl group such as methyl methacrylate and ethyl methacrylate. Also, the acrylic polymer will contain a soft polymer segment obtained from the use of an alkyl methacrylate containing from 4 to 12 carbon atoms in the alkyl group, for example, butyl methacrylate and hexyl methacrylate, or an alkyl acrylate containing from 1 to 8 carbon atoms in the alkyl group, for example, butyl acrylate and 2-ethylhexyl acrylate. Mixtures of alkyl methacrylates containing from 4 to 12 carbon atoms in the alkyl group and alkyl acrylates containing from 1 to 8 carbon atoms in the alkyl group can also be used.

The acrylic polymer will usually also contain carboxylic acid moieties which are introduced into the polymer from the use of an alpha, beta-ethylenically unsaturated carboxylic acid which is copolymerizable with the other vinyl monomers. The unsaturated carboxylic acid will provide sites for subsequent neutralization with a base such as an organic amine to help stabilize the resultant polymeric latex. The unsaturated carboxylic acid will constitute from about 0.1 to 10 and preferably from about 1 to 5 percent by weight of the monomer charge. Examples of unsaturated carboxylic acids are acrylic acid and methacrylic acid. Examples of other less preferred unsaturated acids are crotonic acid, maleic acid or its anhydride, fumaric acid or itaconic acid. Usually when these latter-mentioned acids are used, they are used in combination with acrylic or methacrylic acids.

A third type of vinyl monomer which can be used in preparing the acrylic polymers constitutes copolymerizable monomeric materials containing a vinyl group other than the vinyl monomers mentioned above and described below. Examples of these materials would include monomers such as styrene, alpha-methyl styrene, alpha-chlorostyrene, allyl chloride and acrylonitrile. This third class of unsaturated monomeric materials will constitute about 0 to 60, preferably 0 to 40 percent by weight of the monomer charge.

The acrylic latices are made thermosetting in nature by the presence of curing agents. The curing agents can be integral with the polymer molecule or they can be present as separate components.

Curing agents which are integral with the acrylic polymer molecule are incorporated into the polymer by including within the monomer charge polymerizable vinyl monomers containing so-called self-curing groups. Examples of monomers which contain self-curing groups include N-methylol ether derivatives of acrylic and methacrylic amides. When these monomers are employed, they constitute from 0 to 20, and preferably from 0 to 10 percent by weight of the monomer charge. Such self-curing groups are stable when the acrylic polymer-containing compositions are at room temperature, that is, about 20°-25° C., but under the influence of heat, are reactive with each other or with other active hydrogen groups in the polymer such as hydroxyl groups, carboxylic acid groups, primary amino groups, secondary amino groups, amido groups and thiol groups to crosslink the polymer. Suitable N-methylol ether derivatives of acrylic acid and methacrylic acid amides are those having the following structure:

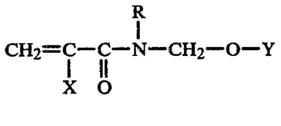

where X is hydrogen or methyl, R is hydrogen, alkyl, aralkyl or aryl containing from 1 to 12 carbon atoms, Y is hydrogen, alkyl, aryl or cycloalkyl containing from 1 to 6 carbon atoms such as methyl, ethyl, n-propyl, n-butyl, phenyl and cyclohexyl. Examples of suitable N-methylol ether derivatives of acrylic and methacrylic amides are N-butoxymethyl acrylamide and N-methoxymethyl methacrylamide.

Besides self-curing acrylic polymers, thermosetting compositions can be formed from acrylic polymers containing active hydrogens and a curing agent which is present in the coating composition as a separate component, for example, an aminoplast. The curing agent is one which is stable in the presence of the active hydrogen-containing acrylic polymer at room temperature, that is 20°-25° C., but is reactive with the active hydrogens under the influence of heat to form a cured or crosslinked product.

Active hydrogens are incorporated into the acrylic polymer by including with the monomer charge polymerized vinyl monomers containing active hydrogens selected from the group consisting of hydroxyl, carboxylic acid, primary amino, secondary amino, amido, and thiol and mixed groups. Preferably, the active hydrogen-containing monomers contain hydroxyl groups, carboxylic acid groups and mixtures thereof.

Examples of carboxylic acid-containing vinyl monomers are those mentioned above.

Examples of vinyl monomers containing hydroxyl groups are hydroxyalkyl acrylates and methacrylates. Preferably, the hydroxyalkyl group will contain from 2 to 4 carbon atoms and examples would include hydroxyethyl acrylate, hydroxyethyl methacrylate, hydroxypropyl acrylate and hydroxypropyl methacrylate.

Examples of vinyl monomers containing primary and secondary amino groups are 2-aminoethyl acrylate, 2-aminopropyl acrylate, 2-methylaminoethyl acrylate, 2-aminoethyl methacrylate, 3-aminopropyl methacrylate, 2,4-diaminobutyl methacrylate, 2-methylaminoethyl methacrylate and 2-aminoethyl ethacrylate.

Examples of vinyl monomers containing amido groups are acrylamide, methacrylamide, ethacrylamide, alpha-chloro acrylamide, vinyl acetamide, N-methyl acrylamide, N-ethyl acrylamide and N-methyl methacrylamide.

Examples of vinyl monomers containing thiol groups are 2-mercapto ethyl acrylate, 3,5-dimercapto acrylate, 2-mercapto ethyl methacrylate, 3-mercapto propyl methacrylate and 2-mercapto ethyl ethacrylate.

The vinyl monomers containing the active hydrogens (exclusive of the carboxylic acid containing vinyl monomer, the proportions of which are given above) can be used in amounts of 0 to 30, preferably 0 to 15 percent by weight, based on total weight of the monomer charge.

As mentioned above, the externally added curing agent is one which is stable with the acrylic polymer at room temperature (20°-25° C.) but reactive with the active hydrogens of the acrylic polymer at elevated temperature, that is, 200° C., to form a cured or crosslinked product. Preferred curing agents are water-soluble or water-dispersible aminoplasts. The aminoplasts are aldehyde condensation products of melamine, benzoguanamine, urea or similar compounds. Generally, the aldehyde employed is formaldehyde, although useful products can be made from other aldehydes such as acetaldehyde, crotonaldehyde, acrolein, benzaldehyde, furfural and others. Condensation products of melamine, urea or benzoguanamine are most common and are preferred but products of other amines and amides in which at least one amino group is present can also be employed. For example, such condensation products can be produced from various diazines, triazoles, guanidines, guanamines and alkyl and di-substituted derivatives of such compounds including alkyl and aryl-substituted ureas and alkyl and aryl-substituted melamines and benzoguanamines. Examples of such compounds are N,N-dimethyl urea, N-phenyl urea, dicyandiamide, formoguanamine, acetoguanamine, 6-methyl-2,4-diamino-1,3,5-triazine, 3,5-diaminotriazole, triaminopyrimidine, 2,4,6-triethyltriamine-1,3,5-triazine and the like.

These amine-aldehyde condensation products contain methylol groups or similar alkylol groups depending upon the particular aldehyde employed. If desired, these methylol groups can be etherified by reaction with an alcohol. Various alcohols are employed for this purpose including essentially any monohydric alcohol, although the preferred alcohols contain from 1 to 4 carbon atoms such as methanol, ethanol, isopropanol and n-butanol.

The amine-aldehyde condensation products are produced in a manner well known in the art using acidic or basic catalyst in varying compositions of time and temperature. The aldehyde is often employed as a solution in water or alcohol and the condensation, polymerization and etherification reactions may be carried out either sequentially or simultaneously. Usually, the external curing agent constitutes about 2 to 20 percent by weight of the thermosetting resinous composition based on total weight of the thermosetting resinous composition and acrylic polymer.

The acrylic polymers can be prepared by emulsion polymerization techniques well known in the art for obtaining uniform particle size. Examples of suitable techniques involve the pre-emulsification technique and the seeding technique. In the pre-emulsification technique, a small amount of water is present in the polymerization vessel together with a polymerization initiator and optionally all or part of the emulsifying agent. The monomer charge is emulsified in a larger amount of water and is continuously added to the reaction vessel under polymerizing conditions. If all the emulsifier is not present initially in the reaction vessel, it can be added simultaneously with the monomer addition. Alternately, the total amount of water may be present in the reaction vessel and the monomer or monomers added in bulk form.

In the seeding technique, a small amount of the monomer charge is added to the reaction vessel along with all or part of the polymerization initiator and all or part of the emulsifier and polymerized to form a seed latex. After formation of the seed latex, the remaining polymerization ingredients are added in a continuous manner to the reaction vessel under polymerizing conditions to form the final polymer emulsion.

The emulsion polymerization should be conducted under conditions so that the average particle size of the latex particles is within the range of 2000 to 3000 Angstroms and the particle size is uniform within this range such that the particle size deviation is ±300 Angstroms. The average particle size can be determined by light scattering techniques. In addition, the average particle size and particle size distribution can be determined by hydrodynamic chromatography. See, for example, Small, *J. Coll. Inter. Sci.*, 48, 147, (1974); McHugh et al, *J. Coll. Inter. Sci.*, Vol. IV, pages 549–561 (1976); and Hamielec, COLUMN CHROMATOGRAPHY OF PARTICLE SUSPENSIONS-AXIAL DISPERSION CORRECTIONS, paper presented at the Cleveland-Akron GPC/LC symposium, Cleveland, Ohio, (April 1977).

The surface active agents which are used in making the acrylic polymer are those which are conventionally used in emulsion polymerization and which are capable of forming micelles and stabilizing particles of polymerizing monomers in the aqueous medium.

The surface active agents which may be used may be either ionic or of the non-ionic type. The ionic types may be either anionic or cationic. Anionic and cationic surface active agents are not usually used in combination with each other, although they can be used in combination with non-ionic surface active agents. The preferred surface active agents are anionic surface active agents and mixtures of anionic and non-ionic surface active agents.

Examples of cationic surface active agents include the long chain quaternary salts such as cetyl triethylammonium chloride and alkyl dimethylbenzylammonium chloride and the like.

Examples of anionic surface active agents which may be used include ordinary soap such as alkali metal, ammonium and alkanolamine salts of fatty acids including sodium oleate, potassium palmitate, ammonium stearate and ethanolamine laurate. Also, the synthetic saponaceous materials including the higher aliphatic sulfates and sulfonates such as sodium lauryl sulfate which is preferred and sodium cetyl sulfate may be employed.

Suitable non-ionic surfactants include alkylphenoxy polyethoxy ethanols having alkyl groups of about 7 to 18 carbon atoms and 6 to 60 or more oxyethylene units, such as heptylphenoxy polyethoxy ethanols, octaphenoxy polyethoxy ethanols, nonylphenoxy polyethoxy ethanols and dodecylphenoxy polyethoxy ethanols; ethylene oxide derivatives of long-chain carboxylic acids such as lauric, myristic, palmitic, oleic; analogous ethylene oxide condensates of long-chain alcohols such as octyl, decyl, lauryl or cetyl alcohols; ethylene oxide derivatives of etherified or esterified polyhydroxy compounds having a hydrophobic hydrocarbon chain such as sorbitan monostearate containing 6 to 60 oxyethylene units can be used.

The amount of surface active agent which is used varies primarily on the selection of the monomers, the choice of surface active agent and the relative proportions of the monomers. Generally, the total amount of surfactant which is fed to the reaction zone is between 0.1 to 5 percent by weight based on total weight of monomers and preferably within the range of 0.1 to 2½ percent by weight.

The free radical polymerization initiator is a water-soluble type. Examples include peroxides such as hydrogen peroxide and ionic types such as ammonium, sodium and potassium peroxydisulfate. Oil-soluble free radical polymerization initiators are not preferred because they do not result in a stable large uniform particle size latex. The amount of initiator which is employed depends somewhat on the nature of the monomers selected including impurities which may accompany the particular monomers. However, the usual range for free radical initiator is about 0.01 to 3 and preferably 0.05 to 1 percent by weight based on total weight of the monomer mixture.

Generally, the solids content of the acrylic polymer prepared by the above method will be from about 35 to 65 percent and usually within the range of about 40 to 60 percent. In addition, it has been found that the polymers of the invention even at these high solids contents and large particle sizes are stable, that is, they will not sediment upon standing at room temperature. If any sedimentation occurs, it can easily be redispersed by mild agitation.

The aqueous latices of the present invention can contain small amounts, for example, up to 15 percent by weight based on total solvent weight, including water, of an organic solvent. The organic solvent can be added to the acrylic latex either during or after the emulsion polymerization, preferably after the polymerization. These solvents should be selected such that they will not adversely affect rheological qualities or drying rates of the applied films or film continuity. Hydrocarbon solvents can be used, although stable (not reactive) ester, ketone, ether-ester and other types of water-miscible solvents can be used.

The latices prepared by the process described above can be mixed with a minor amount, that is, up to 20 percent by weight based on total latex weight, of thickening agents, colloidal stabilizers, anti-foaming agents, preservatives, pigments, pigment extenders and plasticizers if desired.

The latices may be rendered mildly alkaline in pH in the range of 7.5 to 9.5 by adding ammonia or a water-soluble amine to the latex. This insures adequate shelf life of the composition, if any of the additives should tend to partially acidify the formulation.

The thermosetting resinous acrylic latices prepared as described above can be employed in paint compositions in which a percent of the resinous component additionally contains a pigment. Pigments may be any of the conventional types comprising, for example, iron oxides, lead oxides, strontium chromate, carbon black, coal dust, titanium dioxide, talc, barium sulfate, as well as color pigments such as cadmium yellow, cadmium red and chromium yellow.

The pigment content of the paint is usually expressed as the pigment-to-resin weight ratio. In the practice of the present invention, the pigment-to-resin weight ratios are as high as 2:1, for most pigmented coatings, are within the range of 0.5 to 1:1.

The latices of the present invention, including pigmented latices, are stable, that is, they are non-sedimenting when stored at 10 to 30° C. If any sediment does form, it is the type which can be redispersed with mild agitation.

Coating compositions as described above are useful for coil coating applications. Coil coating involves the application of the coating composition to a continuous strip of a metallic substrate, usually aluminum or steel. The metal is of relatively light gauge and comes to the coating operation in the form of coils from which is unwound and continuously coated. After coating, the coil passes into a baking or curing oven where it is cured at relatively high temperatures for a relatively short period of time. The coated article is then passed to further operations where it is fabricated into desirable shapes such as for home and industrial siding as well as automotive and appliance parts.

As mentioned above, the curing conditions for coil coating are rigorous. Generally, the baking oven will be at a temperature sufficient to raise the substrate temperature to at least 190° C. within 60 seconds. When the substrate is metal, this is referred to as the peak metal temperature.

The dry coating thickness of the cured coating will vary depending principally on the coating composition. Dry coating thicknesses of about 0.1 to 2 mils are typical.

Although particularly useful in coil coating applications, the thermosetting aqueous acrylic polymers having the large uniform particle size specified can be applied to any solid substrate such as glass, porcelain or metals other than steel and aluminum such as copper, brass, and nickel, where the coating conditions are rigorous, that is, the temperature of the substrate reaches at least 190° C. within 60 seconds.

EXAMPLES

EXAMPLE 1

The following example shows the preparation of a thermosetting aqueous acrylic polymer latex of a large uniform particle size. A coating composition was formulated with this latex and applied to a continuous length of metal sheet under coil line conditions.

The latex was prepared as follows:

Kettle Charge

| Ingredients | Parts by Weight |
|---|---|
| deionized water | 4493.6 |
| sodium bicarbonate (buffer) | 11.0 |
| sodium lauryl sulfate[1] | 3.6 |

[1] Commercially available from Alcolac Chemical Companyas SIPEX UB.

Initiator Charge

| Ingredients | Parts by Weight |
|---|---|
| ammonium persulfate (free radical initiator) | 32.6 |
| deionized water | 97.7 |

Pre-Emulsified Monomer Feed

| Ingredients | Parts by Weight |
|---|---|
| methyl methacrylate | 4356.0 |
| butyl acrylate | 3746.2 |
| N-butoxymethyl acrylamide (NBMA) | 435.0 |
| acrylic acid | 174.2 |
| SIPEX UB | 141.2 |
| nonyl phenoxy polyethylene oxyethanol[1] | 174.2 |
| deionized water | 1936 |

[1] Commercially available from Rohm and Haas Company as TRITON N 101.

The kettle charge was heated under a nitrogen atmosphere to about 80° C. followed by the addition of the initiator charge. The temperature was raised to about 84° C. and the pre-emulsified monomer feed was initiated and continued over a 3-hour period at a temperature of about 81–84° C. At the completion of the monomer addition, the reaction mixture was thinned with 1200 parts by weight of deionized water, the reaction mixture held for two hours at about 81° C., cooled to 45° C. and neutralized with 160.9 parts by weight of a 50 percent aqueous solution of dimethyl ethanolamine. The final emulsion had a solids content of 48.88 percent, a pH of 7.1 and a Brookfield viscosity of 30 centipoises measured at 22° C. with a No. 1 spindle at 20 rpm's. The resultant latex had an average particle size of 2513 Angstrom units (Å) as determined by light scattering, a particle size of 2400 Å and a particle size distribution of 2400±300 Å (2100–2700 Å) as determined by hydrodynamic chromatography.

A pigment paste was first prepared from the following charge:

| Ingredients | Parts by Weight |
|---|---|
| ACRYSOL I-94[1] | 100 |
| dimethyl ethanolamine | 5 |
| water | 20 |
| silicon defoamer[2] | 2 |
| CYMEL 303[3] | 40 |

-continued

| Ingredients | Parts by Weight |
|---|---|
| butyl CARBITOL[4] | 30 |
| water | 60 |
| $TiO_2$ | 600 |

[1]Aqueous-based acrylic polymer commercially available from Rohm and Haas Company.
[2]Silicon defoamer commercially available from Drew Manufacturing Company as Drew L-475.
[3]Melamine-formaldehyde condensate commercially available from American Cyanamid Company.
[4]Monobutyl ether of diethylene glycol.

The above ingredients were ground in a Cowles mixer to a Hegman 7+grind. The paste was then thinned with 10 grams of water to form the final pigment paste which had a viscosity of about 40 seconds as measured with a No. 2 Zahn cup.

A paint was prepared from the following charge:

| Ingredients | Parts by Weight |
|---|---|
| aqueous acrylic polymer latex prepared as described above | 99 |
| pigment paste as described above | 53.5 |
| deionized water | 11.0 |

Sufficient dimethyl ethanolamine was added to adjust the pH to 8.5. The paint prepared as described above (52 percent total solids) was then applied by a reverse roll coating to a continuous length of aluminum strip at a line speed of 350 feet per minute. The coating was baked under conditions so as to reach a peak metal temperature of 450° F. (232° C.) at a dwell time of about 50 seconds.

The cured coating had all the properties required by coil coating with no evidence of solvent popping.

EXAMPLE 2

The following example shows the preparation of a thermosetting aqueous acrylic polymer latex similar to that of Example 1 but with a larger average particle size. The latex was prepared as follows:

| Ingredients | Parts by Weight |
|---|---|
| **Kettle Charge** | |
| deionized water | 4880.0 |
| sodium bicarbonate | 5.5 |
| **Initiator Charge** | |
| ammonium persulfate | 1125 |
| **Pre-Emulsified Monomer Feed** | |
| methyl methacrylate | 2250.0 |
| butyl acrylate | 1935.0 |
| NBMA | 225.0 |
| acrylic acid | 90.0 |
| SIPEX UB | 72.0 |
| TRITON N 101 | 90.0 |
| deionized water | 1000.0 |
| **Catalyst Feed** | |
| deionized water | 200.0 |
| ammonium persulfate | 5.5 |

The kettle charge was heated under a nitrogen atmosphere to about 78° C. followed by the addition of the ammonium persulfate. The pre-emulsified monomer feed was initiated and continued over a 3-hour period with the temperature of the reaction mixture being maintained between 78°-91° C. After about 1½ hours of the monomer feed, the catalyst feed was initiated and was completed in about one hour and 35 minutes. The reaction mixture was held for one hour at 80° C., cooled to 35° C. and neutralized with 55 parts of a 50 percent by weight aqueous solution of dimethyl ethanolamine. The final emulsion had a solids content of about 41.4 percent, a pH of 8.2 and a Brookfield viscosity measured at 22° C. with a No. 2 spindle at 20 rpm's of 40 centipoises. The latex had an average particle size of 3050 Angstroms as measured by light scattering, a particle size of 2700 Å and a particle size distribution of 2700±300 Å as determined by hydrodynamic chromatography.

When the latex was formulated into a coating composition and evaluated for coil coating as generally described in Example 1, coatings were deposited which had all the requirements required by coil coating with no evidence of solvent popping.

EXAMPLE 3

This example shows the preparation of a thermosetting aqueous acrylic polymer latex similar to that of Example 1. Although the particle size distribution of the latex was uniform, the average particle size was small. The latex was prepared as follows:

| Ingredients | Parts by Weight |
|---|---|
| **Kettle Charge** | |
| deionized water | 2128.0 |
| sodium bicarbonate | 1.9 |
| SIPEX UB | 25.2 |
| TRITON N 101 | 31.5 |
| **Initiator Charge** | |
| ammonium persulfate | 5.8 |
| **Monomer Feed** | |
| methyl methacrylate | 787.5 |
| butyl acrylate | 677.2 |
| NBMA | 78.7 |
| acrylic acid | 31.5 |

The kettle charge was heated under a nitrogen atmosphere to a temperature of about 75° C. followed by the addition of the ammonium persulfate. The temperature of the reaction mixture was raised to about 83° C., the monomer feed was initiated and continued over a 3-hour period with the temperature of the reaction mixture being maintained at about 80°-85° C. At the completion of the monomer feed, the reaction mixture was held for one hour at 80°-85° C. and then cooled to 35° C. followed by the addition of 26 parts by weight of an aqueous solution of dimethyl ethanolamine. The latex was further cooled to 30° C. and filtered through cheesecloth. The final emulsion had a solids content of 41.5 percent, a pH of 7.0 and a Brookfield viscosity of 180 centipoises measured at 22° C. with a No. 2 spindle at 50 rpm's. The latex had an average particle size of 600 Å as measured by light scattering, a particle size of 800 Å and a particle size distribution of 800±300 Å (500-1100 Å) as determined by hydrodynamic chromatography.

When the latex was formulated into a coating composition and evaluated for coil coating as generally described in Example 1, hard coatings were deposited which showed evidence of severe solvent popping and some blushing upon water soaking.

EXAMPLE 4

The following example shows the preparation of a thermosetting acrylic polymer latex similar to that of Example 1, although the average particle size was large. The particle size distribution was non-uniform. The latex was prepared as follows:

| Kettle Charge | |
|---|---|
| Ingredients | Parts by Weight |
| deionized water | 4087.5 |
| sodium bicarbonate | 5.0 |
| **Initiator Charge** | |
| Ingredients | Parts by Weight |
| ammonium persulfate | 15.0 |
| deionized water | 70.3 |
| **Monomer Feed** | |
| Ingredients | Parts by Weight |
| methyl methacrylate | 2205.0 |
| butyl acrylate | 1896.2 |
| NBMA | 220 |
| acrylic acid | 88.2 |
| **Surfactant Feed** | |
| Ingredients | Parts by Weight |
| SIPEX UB | 65.0 |
| TRITON N 101 | 80.0 |
| deionized water | 762.0 |

The kettle charge was heated under a nitrogen atmosphere to about 78° C. followed by the addition of the initiator charge. The reaction mixture was then heated to 80° C. followed by the simultaneous and continuous addition of the monomer feed and the surfactant feed. The monomer feed was added continuously over a period of about three hours and 25 percent of the surfactant feed was added simultaneously with the monomer feed over a period of about 1½ hours. After the completion of the 25 percent of the surfactant feed, the remaining portion of the surfactant feed was then added at once. After completion of the monomer feed, the reaction mixture was thinned with about 69.3 parts by weight of deionized water, held for one hour at about 85°-90° C., and neutralized with 123 parts by weight of a 50 percent aqueous solution of dimethyl ethanolamine. The reaction mixture was finally thinned with 412.5 parts by weight of deionized water. The reaction mixture was cooled to 30° C. and filtered through cheesecloth. The final emulsion had a solids content of 41.5 percent (total theoretical solids of 42.0 percent), a pH of 8.2 and a Brookfield viscosity of 40 centipoises measured at 22° C. with a No. 1 spindle at 50 rpm's. The latex had an average particle size of 2067 Å as measured by light scattering. Hydrodynamic chromatography showed a bimodal distribution of particle sizes. The particle size distribution was as follows:

40% at 4000 Å±300 Å

60% at 800 Å±300 Å

When the latex was formulated into a coating composition and evaluated for coil coating as generally described in Example 1, the paints were unstable in that the pigments settled out. In addition, the resultant coating evidenced solvent popping.

EXAMPLE 5

The following example shows the preparation of a thermosetting acrylic polymer latex similar to that of Example 1 but with a high average particle size. The latex was prepared as follows:

| Kettle Charge | |
|---|---|
| Ingredients | Parts by Weight |
| deionized water | 1135.8 |
| sodium bicarbonate | 1.9 |
| **Initiator Feed** | |
| Ingredients | Parts by Weight |
| ammonium persulfate | 5.7 |
| deionized water | 17 |
| **Pre-Emulsified Monomer Feed** | |
| Ingredients | Parts by Weight |
| methyl methacrylate | 767.6 |
| butyl acrylate | 661.2 |
| NBMA | 76 |
| acrylic acid | 15.2 |
| deionized water | 1000 |
| dioctyl sodium sulfosuccinate[1] | 11.4 |

[1] Commercially available from American Cyanamid Company as AERSOL OT.

The kettle charge was heated to 80° C. under a nitrogen atmosphere followed by the addition of the initiator feed. The pre-emulsified monomer feed was then initiated and continued over a 3-hour period while maintaining a reaction temperature of about 83°-90° C. At the completion of the pre-emulsified monomer feed, the reaction mixture was held for two hours at 83°-85° C., cooled to 45° C. and neutralized with 13.6 parts by weight of a 50 percent aqueous solution of dimethyl ethanolamine. The final emulsion had a solids content of 40 percent (theoretical total solids of 40 percent), and a pH of 5.7. The latex had an average particle size of 4320 Å as determined by light scattering, a particle size of 3500 Å and a particle size distribution of 3500±500 Å as measured by hydrodynamic chromatography. The latex, however, was not stable by itself or in a paint formulation. The polymer particles formed a hard sediment and paints usually had both latex and pigment particle sediment which was not redispersible.

We claim:

1. In a method of coating a solid substrate which is cured under conditions such that the substrate reaches a temperature of at least 190° C. within 60 seconds with a thermosetting aqueous acrylic polymer latex, the improvement comprising coating said substrate with a stable acrylic polymer latex having an average particle size within the range of 2000 to 3000 Angstrom units and the particle size deviation is ±300 Angstrom units.

2. The method of claim 1 in which the acrylic polymer is prepared from polymerizing the following mixture of monomers:

| Monomer | Percent by Weight |
|---|---|
| alkyl acrylate or methacrylate containing from 1 to 18 carbon atoms in the alkyl group | 30-90 |
| alpha, beta-ethylenically unsaturated carboxylic acid | 0.1-10 |
| N-methylol ether derivatives of acrylic and methacrylic amides | 0-20 |
| vinyl monomers containing active hydrogens selected from the class consisting of hydroxyl, amido, primary amine, secondary amine and thiol | 0-15 |
| vinyl monomer different from those above | 0-60 |

3. A length of coil metal which has been coated by the method of claim 1 and in which the coating is free of solvent popping.

* * * * *